Aug. 26, 1969    J. F. LINDEMAN    3,463,239
SPRING TOOTH CHAIN WEEDER
Filed Jan. 9, 1967    3 Sheets-Sheet 1
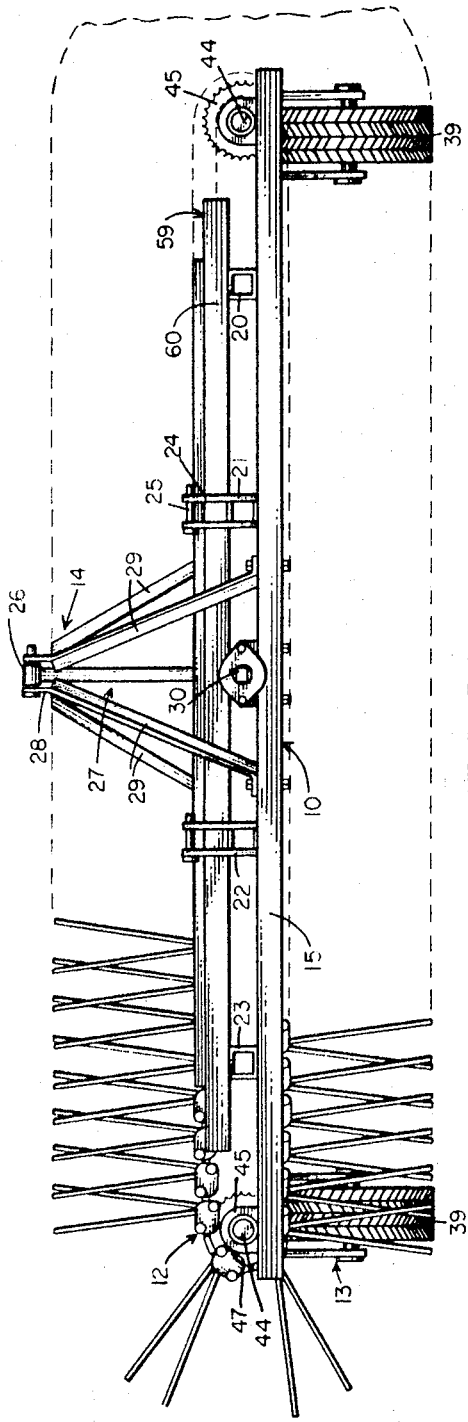
FIGURE 1
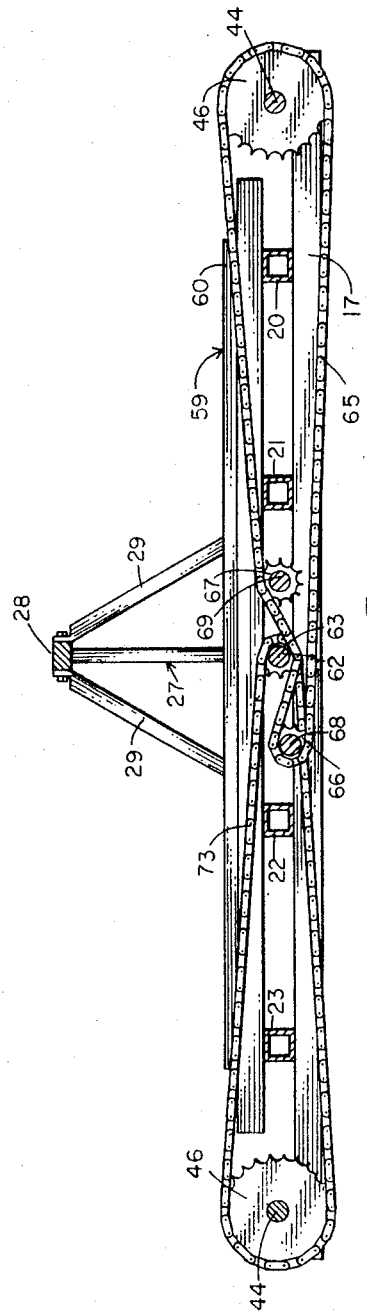
FIGURE 3
Joe F. Lindeman, INVENTOR.
BY 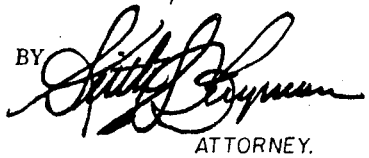
ATTORNEY.

Aug. 26, 1969     J. F. LINDEMAN     3,463,239
SPRING TOOTH CHAIN WEEDER
Filed Jan. 9, 1967     3 Sheets-Sheet 2
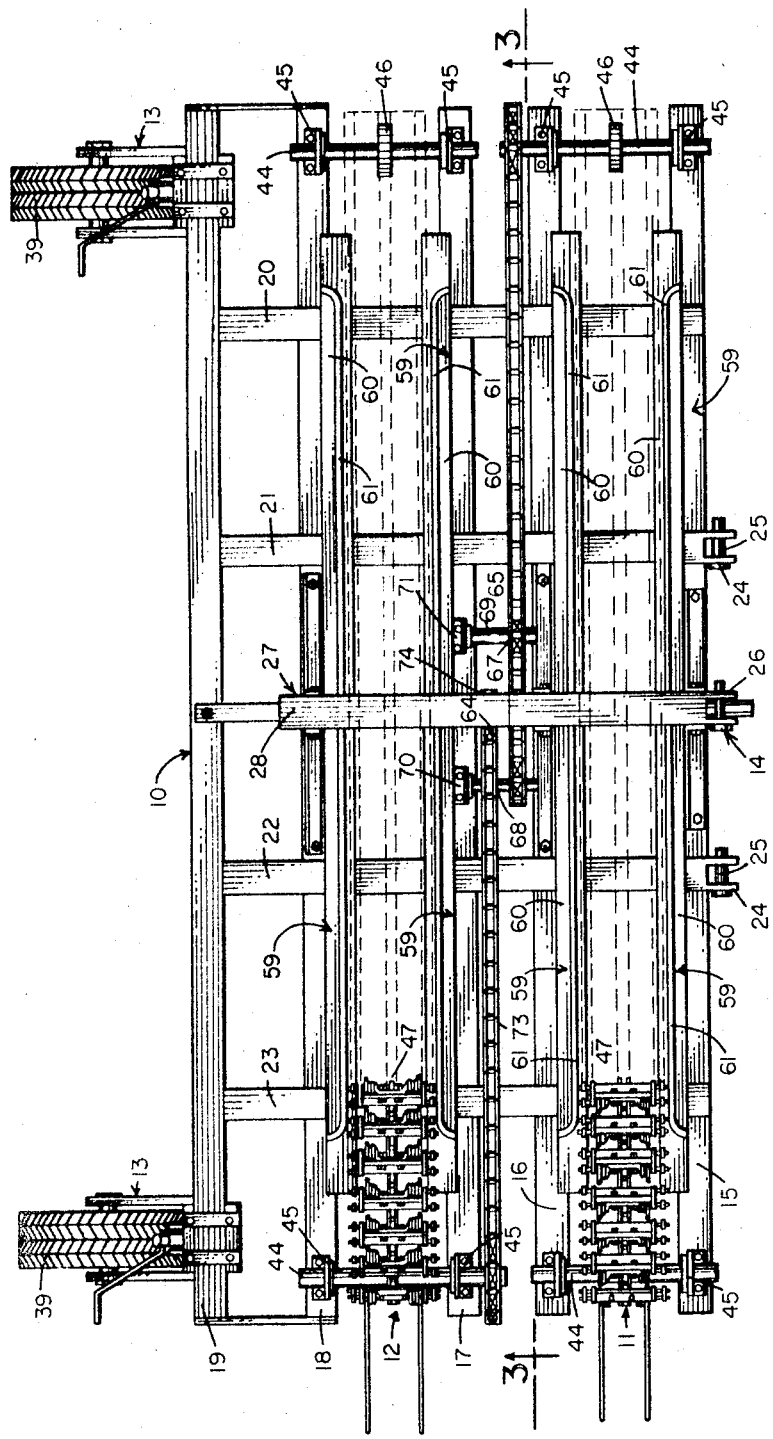
FIGURE 2
Joe F. Lindeman,
INVENTOR.
ATTORNEY.

Aug. 26, 1969        J. F. LINDEMAN        3,463,239
SPRING TOOTH CHAIN WEEDER
Filed Jan. 9, 1967                3 Sheets-Sheet 3
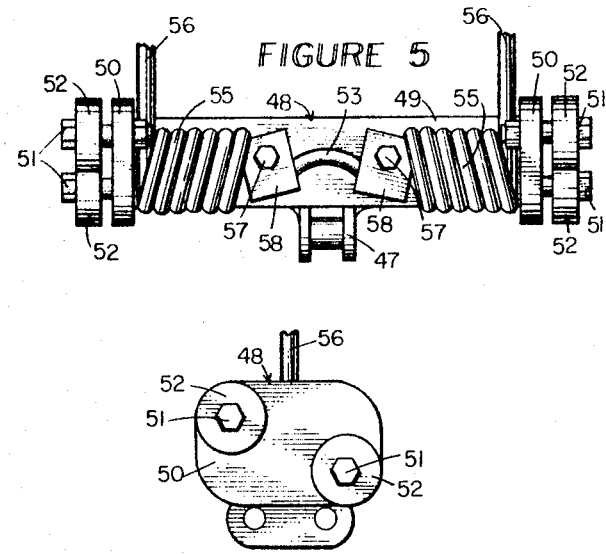
FIGURE 5
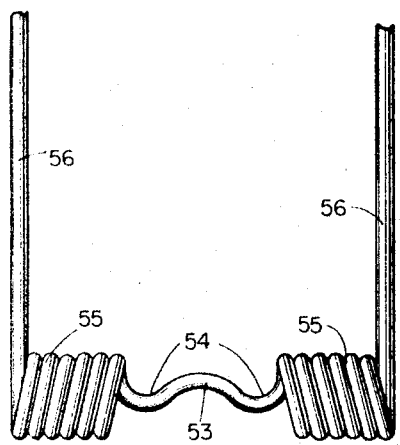
FIGURE 4
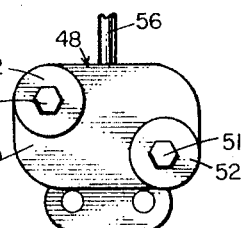
FIGURE 6
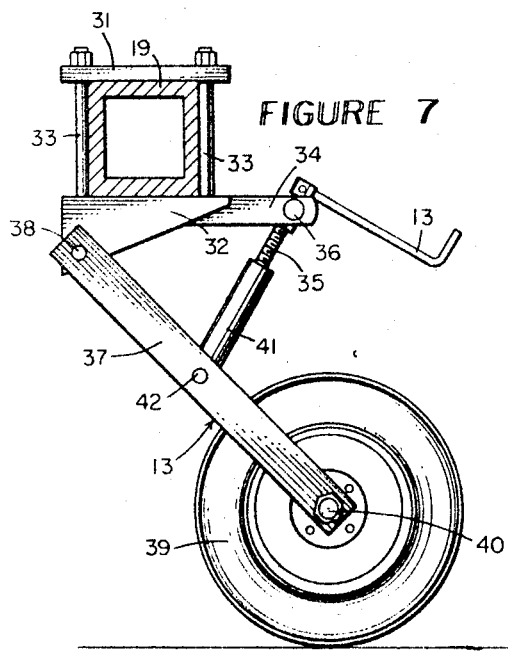
FIGURE 7
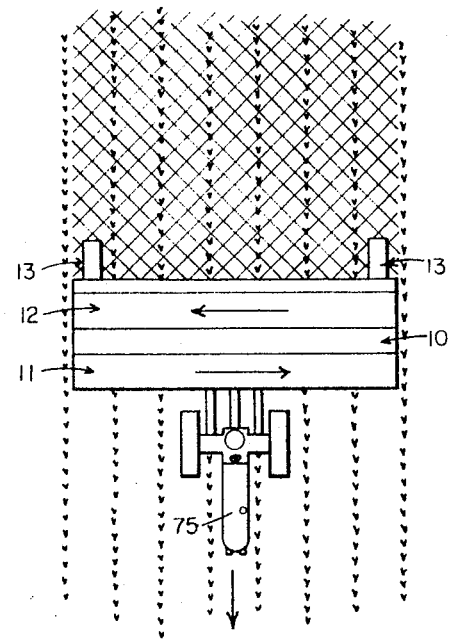
FIGURE 8
Joe F. Lindeman, INVENTOR.
ATTORNEY.

United States Patent Office 3,463,239
Patented Aug. 26, 1969

3,463,239
SPRING TOOTH CHAIN WEEDER
Joe F. Lindeman, 1006 N. 48th Ave.,
Yakima, Wash. 98902
Filed Jan. 9, 1967, Ser. No. 608,066
Int. Cl. A01b 33/10, 33/08; A01d 77/00
U.S. Cl. 172—100                                    2 Claims

ABSTRACT OF THE DISCLOSURE

An agricultural implement for weeding providing a wheeled frame vertically adjustable relative the underlying supporting earth and having two spaced transverse courses for motion of endless weeding elements transversely to the course of travel of the implement. Mechanical linkage is provided from an independent power source to cause one weeding element to move oppositely to the other. The weeding elements are provided with plural, elongate somewhat flexible teeth to communicate with and move through the earth therebelow.

---

My invention relates generally to an agricultural implement for cultivating and weeding and more particularly to such an implement that has plural spring toothed weeding elements mounted on two oppositely-moving courses for fine adjustment of speed and penetration into the earth.

The mechanical removal of weeds from young row crops presents an ever present problem of agricultural husbandry. Much of this work has been accomplished by hand labor, even after the mechanical revolution in agriculture, and today much of it is still so accomplished. Mechanical means for performing this function have become known but there is little physical distinction between young row crop plants and young weeds upon which to base any selective mechanical weeding activity and because of this, such mechanical devices as are known generally either require constant operator attention to direct their activities or are quite inefficient in removing desirable plants and failing to remove undesirable ones in the weeding operation.

Most common weeds of agricultural importance are reasonably shallow rooted, at least in their earlier stages, and generally this is the only practical distinguishing physical feature available to mechanically segregate weeds from desirable plants. Generally, also, because of the peculiar structure and physiology of weeds, if the weed be severed from the earth or have the enveloping earth structure partially removed from its roots, the weeds' vital processes are sufficiently disrupted to cause death under commonly prevailing environmental conditions.

Various flexible toothed weeders, basing their action upon this distinction, have become known in the past. Such devices have, however, been crude in their regulation of adjustable features, reasonably discontinuously in application of their operation over a given area and of course machine design—all of which have lessened the ability to distinguish between and operate upon the differing characteristics of plant and weed to such a degree that the devices have not been practical.

With these thoughts in mind the instant invention was conceived. In so doing it is:

A principal object of my invention to provide a mechanical weeding device with two oppositely moving courses of elastically deformable tooth-like weeding elements adapted to be finely adjustable as to penetration into the soil and speed and course of motion relative thereto.

A further object of my invention to provide such a device with the cultivating element courses positioned transversely on a wheeled frame provided for motion by a tractor of agricultural commerce in a direction perpendicular thereto so that the resultant course of cultivation will be diagonal with reference to the ground traversed.

A still further object of my invention to provide such a cultivating device that is sufficiently finely regulable in its cultivation of the soil surface to allow practical operable distinguishment between a shallowly rooted weed and a more deeply rooted plant of agricultural husbandry to allow removal of the weeds from the agricultural plants without damage to the latter.

A still further object of my invention to provide such an agricultural implement that is of new and novel design, of simple and economical manufacture and operation, of rugged and durable nature and one that is otherwise well adapted to the uses and purposes for which it is intended.

These and other objects of my invention will become apparent from consideration of the following specification and accompanying drawings which form a part of this application. In carrying out the objects of my invention, however, it is to be understood that its essential features are susceptible of change in design and arrangement with only one preferred practical embodiment being illustrated and specified, as required.

In the accompanying drawings, wherein like numbers of reference refer to similar parts throughout:

FIGURE 1 is an orthographic, vertical front view of my invention showing its parts, their relationship and configuration with only part of the teeth shown in detail to facilitate illustration.

FIGURE 2 is an orthographic top view of the invention of FIGURE 1, showing its various parts from this aspect, again with only a part of the cultivating teeth shown.

FIGURE 3 is a vertical, cross-sectional view of the invention of FIGURE 2, taken on the line 3—3 thereon, in the direction indicated by the arrows, showing particularly the driving mechanism of my invention.

FIGURE 4 is a partial orthographic view of a spring cultivating element of my invention.

FIGURE 5 is a partial top orthographic view of a cultivating element, as shown in FIGURE 4, in place on a holding bar of an operating chain element of my invention, illustrating particularly the fastening of this unit to the operating chain.

FIGURE 6 is an end view of the chain element of FIGURE 5, showing the details of its formation from this aspect.

FIGURE 7 is a vertical, orthographic view of the leveling wheel of my invention, illustrating its operation.

FIGURE 8 is a semi-diagrammatic plan view of my invention being moved through a row crop field by a tractor to illustrate particularly the resultant diagonal cultivation.

Referring now to the drawings in more detail and particularly to those of FIGURES 1 and 2, it will be seen that my invention comprises essentially frame 10 operatively carrying forward course of cultivator teeth 11 and rearward course of cultivator teeth 12 for lateral linear motion and provided with adjustable wheels 13 and three-point hitch 14 to aid in locomotion.

Frame 10 is formed from plural laterally extending structural members 15, 16, 17, 18, 19 joined by structurally communicating forwardly extending cross-supports 20, 21, 22, 23 to form a rigid rectangular frame carrying the operative elements of my invention.

Three-point hitch 14 has its two lower members 24, carrying connector pins 25, positioned on the forward medial part of lateral member 15 at appropriately spaced distances. Central point 26 of the hitch is medially disposed above the principal frame on secondary hitch frame 27, preferably constituting a bridge-type structure with principal member 28 communicating rearwardly substantially to rearward lateral member 19 and joining the adjacent cross-members by way of angled supports 29. This hitch is so configured and dimensioned as to be adapted to communicate with the normal three-point hitch structure carried by many tractors of agricultural commerce.

Power take-off connector 30, adapted to receive the power take-off shaft of a commercial tractor, is medially positioned on the central forward part of forward lateral member 15 as illustrated in FIGURE 1. This connector operatively communicates with the driving mechanism of my invention as hereinafter specified.

Adjustable wheel structure 13 comprises two similar cooperating units disposed at spaced distances on rearward lateral member 19.

Each includes upper shackle plate 31 on top of lateral member 19 and lower wheel plate 32, disposed on the underside of this member, releasably communicating by shackle bolt-nut combination 33. Lower wheel plate 32 has rearwardly extending adjustment screw arm 34 pivotably mounting adjustment screw 35 by its threaded engagement with shaft 36. Pivotably depending from lower wheel plate 32 in its forward part is wheel yoke 37 supported thereon by pivot shaft 38 and in turn rotatably supporting wheel 39 on shaft 40 journaled in the lower extension thereof. Screw housing 41, adapted to threadedly communicate with screw 35, pivotally communicates by shaft 42 with the medial portion of the wheel yoke. Preferably handle 43 is provided for adjustment screw 35 to aid in its manual manipulation. With this structure the screw 35 may be adjusted to change the angle between lower shackle plate 32 and wheel yoke 37 to thusly regulate the positioning of frame 10 relative the surface supporting, in cooperation with some appropriate support communicating with three-point hitch 14.

Both forward cultivator structure 11 and rearward structure 12 are similar except for their powering. Each includes spaced, paired cooperating jack shafts 44 journaled in paired opposed bearings 45, preferably of the self-aligning type, positioned on the upper lateral part of the respective lateral frame members 15, 16 and 17, 18. If desired, at least one paired set of bearings carrying each cultivator may adjustably communicate with the frame members to provide for adjustment in length of chains carried therebetween. Each jack shaft 44 irrotatably carries chain drive cogs 46 to operatively communicate with cultivator chain 47 in transmitting motion of the cog thereto.

Cultivator chain 47 is an ordinary link roller chain of commerce carrying plural laterally extending cultivator bars 48, illustrated in detail in the drawings of FIGURES 5 and 6, where these bars are seen to include elongate body 49 communicating with elements of chain 47, and perpendicular end pieces 50, each carrying upper and lower alignment wheel 52 journaled for rotation on the shaft of nut-bolt combination 51 laterally extending from end pieces 50. These alignment wheels are adapted to cooperate with frame members to maintain the cultivator chain in appropriate position for motion and cultivation relative to the machine frame.

A cultivator element may be carried by each spring bar. These elements include a central body part 53 having indentations 54, to aid in attachment to the cultivator bar, and opposed spring elements 55 terminating in perpendicularly projecting teeth 56, elastically deformable with reference to the body member. The cultivating elements are fastened to spring bars 48 by plural fastening bolts 57 extending between fastening plates 58 on the one side of the cultivator element and the spring bar 48 on the other side. With this arrangement the spring bars are rigidly positioned but may be removed or replaced as desired.

The cultivator member is adapted to move transversely (as defined by normal frame locomotion) to the frame of the mechanism in a course as defined by alignment elements 59 positioned transversely on the frame on each side of the cultivator course. The cultivator alignment elements 59 have horizontally extending bases 61 adapted to rollably support the alignment wheels 52, carried by spring bars 48 and the vertical element 60 of the alignment members serves to prevent any forward or rearward motion of the chain from its predetermined course.

Each cultivator member is driven by power take-off 30 as illustrated in FIGURE 3. Power take-off 30 communicates by rearwardly extending central power shaft 62 journaled in appropriate bearings on the implement frame rearwardly to irrotatably mount forward power take-off cog 63 and rearward power take-off cog 64. Forward drive chain 65 of the endless roller variety communicates from idler sprocket 66, irrotatably carried on jack shaft 68 journaled in opposed bearing 70, about forward course driving cog 72 and thence back over the upper portion of second idler sprocket 67, irrotatably carried on jack shaft 69 journaled in opposed bearing 71 on the implement frame, thence operatively on the undersurface of forward power take-off cog 63 and back to first idler sprocket 66 to form a complete circuit driven by the undersurface of the forward power take-off cog 63. Rearward driving chain 73 communicates from rearward power take-off cog 64 in a closed course about rearward driving cog 74 to drive this chain in a direction opposite to that of the forward chain upon rotation of the drive shaft in a particular direction. With this arrangement of elements it is seen that the forward cultivator member will move laterally in one direction opposite to that of the rearward cultivator element.

Power is supplied to power take-off connection 30, and thusly to central power shaft 62, by communication with the power take-off element of an agricultural tractor 75 of normal commerce.

With the structure of my invention having thusly been described, its operation can now be understood.

The implement is constructed according to the aforesaid teachings and operatively attached to an agricultural tractor of commerce with the power take-off element of the tractor communicating to the power take-off connection 30 and the three-point hitch of the tractor communicating with the respective hitch elements of the implement. In this condition the implement is propelled down the rows of a field, usually implanted with row crops, as illustrated in FIGURE 8. As the machine moves in a parallel fashion down the rows of the field, the two cultivator courses will be moving perpendicularly to the rows and the combined motions relative the earth will create a pattern of cultivator tooth-earth relationship in the diagonal fashion illustrated. The speed of both tractor and cultivator elements may be appropriately regulated by tractor velocity and power take-off speed to obtain many various combinations. The penetration of cultivator elements into the earth may also be finely adjusted by relative adjustment of the three-point hitch and the supporting implement wheels.

With these adjustments, a particular type of physical activity of the cultivator elements may be determined to operate as closely as possible on the difference between the structures of agricultural plants and weeds so as to selectively extinguish the weeds. The weeds will normally be completely disturbed in their relationship with the earth or sufficiently disturbed as to extinguish their vital functions under the normal environmental conditions commonly existing in agricultural husbandry while the damage, if any, so agricultural plants will be so slight that it will be readily repaired by the plant and have little or no effect upon its vital activity.

It is to be noted particularly that the structure described, that is, with moving courses of elongate elastically deformable cultivating teeth, allows for a much finer and more varied adjustment of physical activity of these teeth relative to the earth than other mechanisms using the same or similar teeth in a stationary fashion without any particular adjustability of distance between the implement and the earth and of motion of the teeth relative thereto.

The foregoing description of my invention is necessarily of a detailed nature so that a specific embodiment of it might be set forth, as required, but it is to be understood that various changes in detail, rearrangement and multiplication of parts may be resorted to without departing from its spirit, essence or scope.

Having thusly described my invention, what I desire to protect by Letters Patent, and what I claim is:

1. An agricultural device of the nature aforesaid comprising, in combination:
   a frame having means of attachment to a propelling power supplying vehicle;
   wheels providing locomotion for said frame in cooperation with aforesaid supporting vehicle, adjustably positionable relative said frame to regulate the distance between operative structures carried by said frame and the earth therebelow;
   a first cultivating member including an endless chain carrying plural cultivating elements having elastically deformable teeth communicating with the earth, said cultivating chain being carried for linear motion along a course laterally extending across said frame and perpendicular to normal course of travel of said frame;
   a second similar cultivating member at a spaced distance rearward of said first cultivating member; and
   mechanical linkage transmitting power from said propelling vehicle to the cultivating members to move said first cultivator in a course opposite in direction to that of said second cultivator,
   said mechanical linkage including:
      a central drive shaft powered for rotary motion by said propelling vehicle;
      a first and a second driving cog irrotatably carried by said drive shaft at a spaced distance;
      a forward driving chain, carried upon idler cogs to operatively communicate with the lower surface of said first driving cog, communicating to a shaft common with said first cultivating member to drive said member in one direction in response to motion of said central drive shaft; and
      a rearward driving chain operatively communicating about said second driving cog and with a shaft common with said second cultivating member to drive said member in a direction opposite to said first cultivator member.

2. The invention of claim 1 wherein said endless cultivator chain is further characterized by:
   a roller chain carrying a plurality of elongate cultivator element bars having perpendicularly opposed end members rotatably supporting laterally projecting plural alignment wheels, and
   paired spaced opposed alignment bars carried by said frame and rollably supporting said alignment wheels against both upward vertical thrust and lateral thrust to define the vertical and side limits of motion of said chain.

References Cited

UNITED STATES PATENTS

| | | | |
|---|---|---|---|
| 1,048,808 | 12/1912 | Bushong | 172—100 X |
| 2,648,271 | 8/1953 | Youngs | 172—427 X |
| 2,790,538 | 4/1957 | Collins et al. | 56—400 X |
| 2,990,021 | 6/1961 | Johnson et al. | 56—400 X |

FOREIGN PATENTS

| | | |
|---|---|---|
| 230,142 | 3/1963 | Austria. |

ROBERT E. PULFREY, Primary Examiner

STEPHEN C. PELLEGRINO, Assistant Examiner

U.S. Cl. X.R.

56—400; 172—46